(12) United States Patent
Roy

(10) Patent No.: US 7,110,655 B2
(45) Date of Patent: Sep. 19, 2006

(54) FIBER OPTIC LIGHT BAR

(76) Inventor: Laurier Roy, 30, Jeanne D'Arc, Gatineau, Quebec (CA) J8Y 6S2

( * ) Notice: Subject to any disclaimer, the term of this patent is extended or adjusted under 35 U.S.C. 154(b) by 0 days.

(21) Appl. No.: 11/143,078

(22) Filed: Jun. 2, 2005

(65) Prior Publication Data

US 2005/0271345 A1    Dec. 8, 2005

Related U.S. Application Data

(60) Provisional application No. 60/575,830, filed on Jun. 2, 2004.

(51) Int. Cl.
*G02B 6/00* (2006.01)
*A41F 1/00* (2006.01)

(52) U.S. Cl. ........................ 385/136; 362/581
(58) Field of Classification Search ................ 362/581, 362/559
See application file for complete search history.

(56) References Cited

U.S. PATENT DOCUMENTS

| | | |
|---|---|---|
| 3,500,036 A | 3/1970 | Szentveri |
| 4,107,767 A | 8/1978 | Anquetin |
| 5,000,535 A | 3/1991 | Churchill |
| 5,050,047 A | 9/1991 | Viner et al. |
| 5,163,752 A * | 11/1992 | Copeland et al. ........... 362/396 |
| 5,299,112 A | 3/1994 | Nivette, Jr. et al. |
| 5,383,633 A * | 1/1995 | Ellestad ..................... 248/160 |
| 6,231,217 B1 * | 5/2001 | Krippelz, Sr. ............... 362/477 |
| 6,278,833 B1 | 8/2001 | Lee |
| 6,337,945 B1 * | 1/2002 | Kingstone .................. 385/147 |
| 6,375,342 B1 | 4/2002 | Koren et al. |
| 6,585,400 B1 * | 7/2003 | Leen .......................... 362/418 |

* cited by examiner

*Primary Examiner*—Michelle Connelly-Cushwa
*Assistant Examiner*—Chris Chu

(57) ABSTRACT

A light bar includes an optical fiber, a mounting member, and a fiber supporting member. The fiber supporting member is connected to the mounting member. The optical fiber is supported by the fiber supporting member.

4 Claims, 5 Drawing Sheets

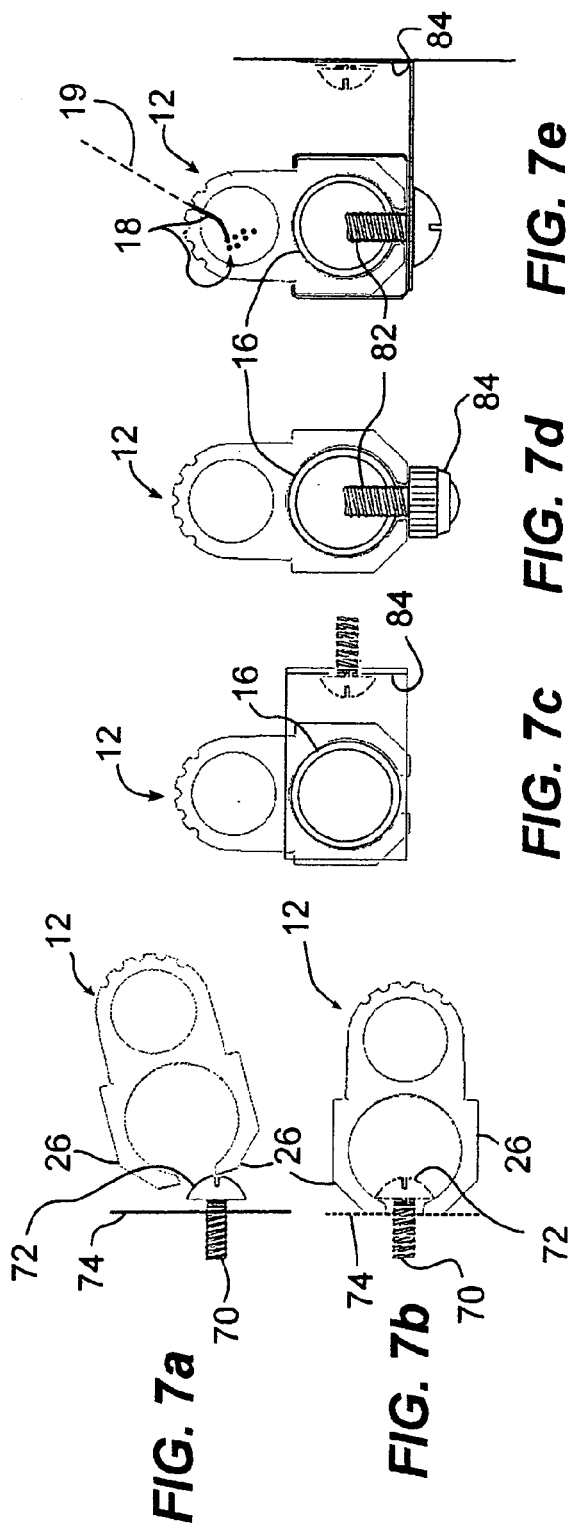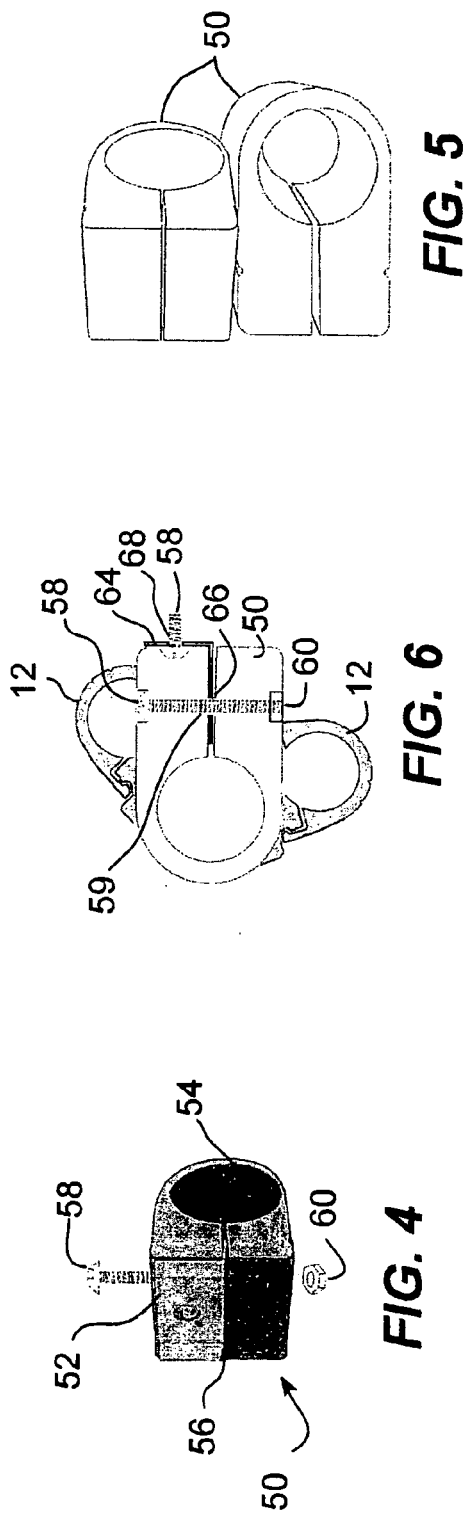

FIBER OPTIC LIGHT BAR

This application claims priority based on provisional application 60/575,830 filed Jun. 2, 2004

FIELD OF THE INVENTION

The present invention relates to lights. More specifically, the present invention is concerned with a fiber optic light bar.

BACKGROUND OF THE INVENTION

There are many types of lights using optical fiber that are commercially available. These lights are used both in home and commercial settings.

One example of such a light is a lamp including a base and a multi-strand optical fiber. The optical fiber is inserted into the base and the strands of the optical fiber form a sphere above the base. In this lamp, light is emitted in all directions.

In this type of lamp, there is no directionality to the light emitted. Therefore, it is somewhat difficult to control the lighting of a room wherein the lamp is located. Also, the lamp is not easily affixed to a generally vertical surface.

Other examples of fiber optic lights include a tubular member through which a multi-strand optical fiber is inserted. The tubular member includes a plurality of openings for receiving the strands of the optical fiber. Many types of such lights are commercially available. However, there is typically no flexibility in the manner through which a tubular member is mounted to a surface or supported by a base.

In addition, commercially available lights have a geometry that makes assembly of the light difficult.

Against this background, there exists a need in the industry to provide a novel fiber optic light bar.

OBJECTS OF THE INVENTION

An object of the present invention is therefore to provide an improved fiber optic light bar.

SUMMARY OF THE INVENTION

More specifically, in accordance with the present invention, there is provided a fiber optic light bar. The light bar includes an optical fiber, a mounting member, and a fiber supporting member. The fiber supporting member is connected to the mounting member. The optical fiber is supported by the fiber supporting member.

In a variant, the mounting member is a substantially elongated member having a substantially uniform cross section. The cross section is substantially C-shaped. Also, the fiber supporting member is also substantially elongated with a substantially uniform cross section. The cross section of the fiber supporting member is generally U-shaped.

The mounting member and the fiber supporting member are configured and sized such that the fiber supporting member is snappingly attachable to the mounting member. When the fiber supporting member is attached to the mounting member, the two members define a passageway for receiving the optical fiber.

The fiber supporting member includes a plurality of openings for receiving strands of the optical fiber. Therefore, light coming into the optical fiber exits the light bar through the strands of the optical fiber, which are inserted into the openings of the fiber supporting member.

The mounting member defines a substantially elongated opening. The opening allows mounting of the mounting member in a plurality of ways. For example, the opening allows mounting of the mounting member onto a rod such that the mounting member frictionally engages the rod. In addition, the mounting member is also mountable to screws inserted into a surface. There are also many other alternative ways of mounting the mounting member Advantageously, the light bar is relatively light, relatively easy to assemble and relatively easy to manufacture. Also, the light bar creates flexibility in the way in which it is supported, which adds flexibility to the various uses of the light bar.

Other objects, advantages and features of the present invention will become more apparent upon reading of the following non-restrictive description of preferred embodiments thereof, given by way of example only with reference to the accompanying drawings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

In the appended drawings:

FIG. 4 illustrates a mounting block used in some embodiments illustrated in FIG. 3;

FIG. 5 illustrates two blocks similar to the block of FIG. 4 attached together;

FIG. 6 illustrates the block of FIG. 4 mounted to a bracket;

FIG. 7A illustrates an alternative way of mounting the light bar of FIG. 1;

FIG. 7B illustrates another alternative way of mounting the light bar of FIG. 1;

FIG. 7C illustrates yet another alternative way of mounting the light bar of FIG. 1;

FIG. 7D illustrates yet another alternative way of mounting the light bar of FIG. 1;

FIG. 7E illustrates yet another alternative way of mounting the light bar of FIG. 1.

DETAILED DESCRIPTION

Figures 1A, 1B:
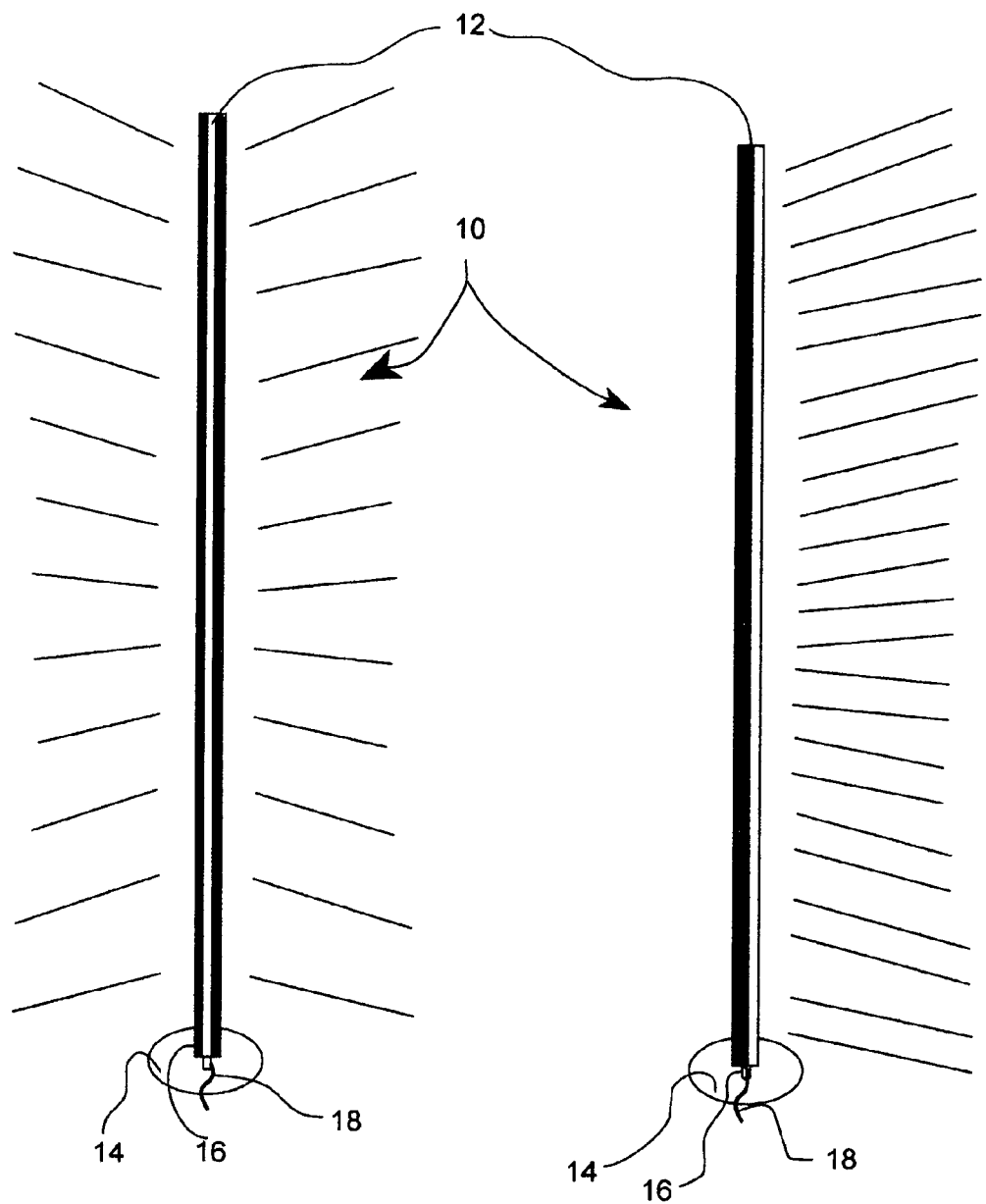
FIG. 1A illustrates a lamp including a fiber optic light bar.
FIG. 1B illustrates the lamp of FIG. 1A in a different orientation.

FIGS. 1A and 1B show a lamp 10 including a fiber optic light bar 12, a base 14 and a support tube 16. The support tube 16 is mounted to and substantially perpendicular to the base 14. The fiber optic light bar 12 is connected to the support tube 16. An optical fiber 18 is provided within the fiber optic light bar 12. A light source (not shown in the drawings) provides light to the optical fiber 18.

The optical fiber 18 is a multi-strand optical fiber. As described in more details hereinbelow, the fiber optic light bar 12 includes a plurality of holes 44 for receiving strands of the optical fiber 18 and through which emerges a ray of light 19. Therefore, when light is provided into the optical fiber 18, the lamp 10 provides illumination through the various strands optical fiber 18 exiting through the holes 44 of the fiber optic light bar 12.

Figure 2:
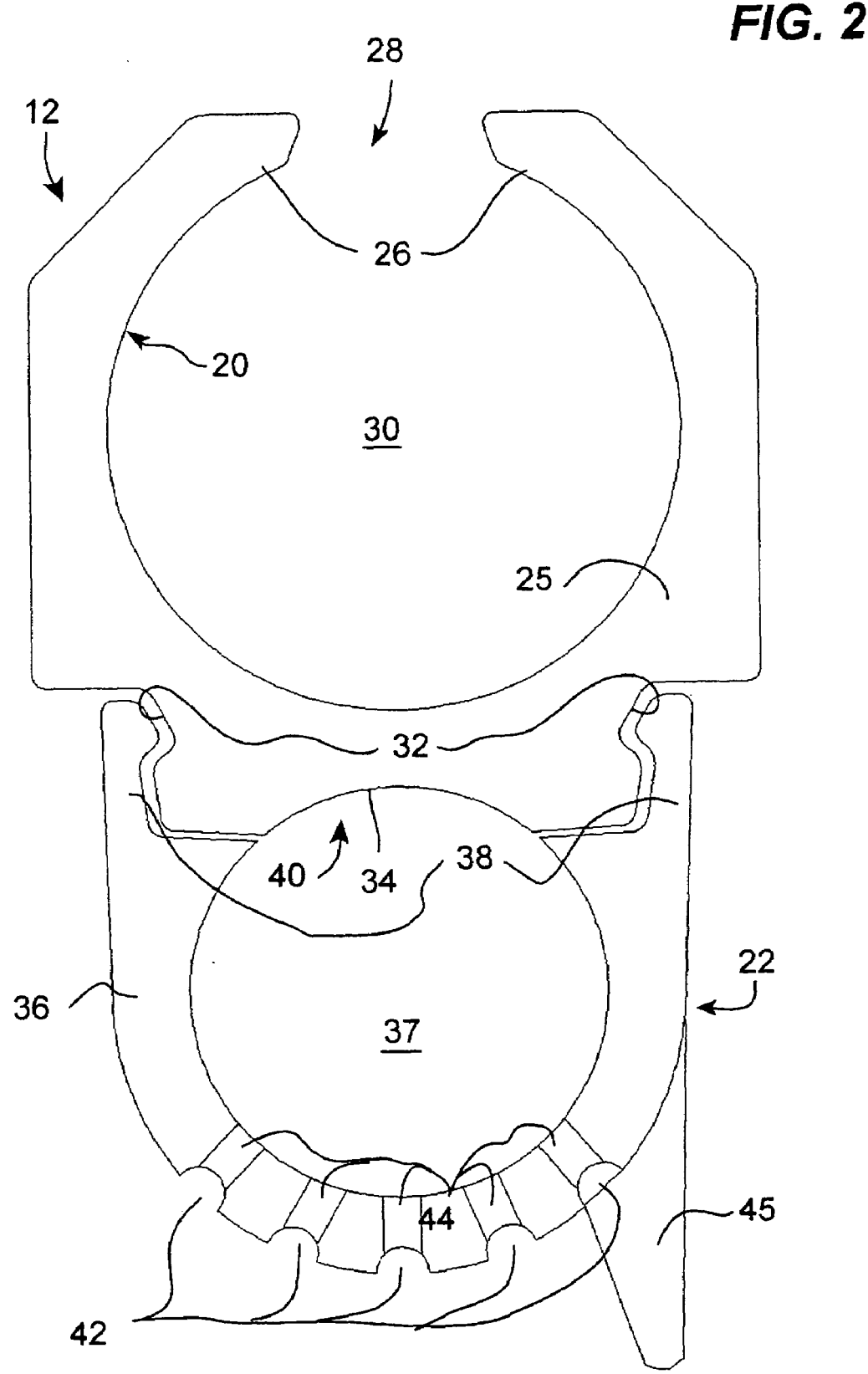
FIG. 2 is a cross section of the light bar of FIG. 1.

In a specific embodiment of the invention, the fiber optic light bar 12 includes a substantially uniform cross section. This allows to non-limitatively manufacture the light bar 12 through an extrusion process. This cross section is illustrated in FIG. 2.

The fiber optic light bar 12 includes a mounting member 20 and a fiber supporting member 22. The fiber supporting member 22 is releasably attached to the mounting member 20. The mounting member 20 is generally C-shaped, while the fiber supporting member 22 is generally U-shaped.

The mounting member 20 includes a body 25 from which two legs 26 extend. The legs 26 define an opening 28 extending therebetween. The body 25, along with the legs 26, defines a mounting member bore 30 for receiving the support tube 16.

In a specific embodiment of the invention, the body 25 includes two notches 32 provided peripherally to the mounting member 20. The notches 32 are provided to receive latches 38 from the supporting member 22, as described hereinbelow. The mounting member 20 further includes an arced surface 34 provided peripherally to the body 25.

The fiber supporting member 22 includes a fiber supporting member body 36 defining a supporting member bore 37. Latches 38 extend from the fiber supporting member body 36. The fiber supporting member body 36, along with the latches 38, defines an opening 40.

The latches 38 are configured and sized to engage the notches 32, thereby attaching the fiber supporting member 22 to the mounting member 20. When the fiber supporting member 22 is attached to mounting member 20, the fiber supporting member body 36 along with the arcuate surface 34 defines the supporting member bore 37.

In some embodiments of the invention, at least one groove 42 extend substantially longitudinally on the fiber supporting member body 36 of the fiber supporting member 22. For example, the grooves 42 are substantially parallel and separated by an angle of approximately 22.5°. However, the reader skilled in the art will readily appreciate that any number of grooves 42, and any angle therebetween, are within the scope of the invention.

The grooves 42 are guides facilitating the piercing of holes 44 in the fiber supporting member body 36 of the fiber supporting member 22. The holes 44 are for receiving the strands of the optical fiber 18.

The holes 44 are present substantially along the entire length of the fiber supporting member 22. In specific examples of implementations, the holes 44 are separated by distances of ¼, ½ or 1 inch. However, other separation distances are within the scope of the invention. A light cut-off shield 45 extending integrally from the fiber supporting member 22 shields the appearance of the points of lights created by the optical fiber 18.

The method of assembly includes the steps of having the fiber supporting member 22 taken separately from the mounting member 20. Then, the holes 44 are pierced into the fiber supporting member body 36. Thereafter, the optical fiber 18 is mounted to the fiber supporting member 22 by inserting the strands of the optical fiber 18 into the holes 44.

The distance between the holes 44 generally controls the intensity of light emitted by the lamp 10. Closer holes provide more light per surface area of the lamp 10, thereby increasing the luminosity of the lamp 10. This is shown in FIGS. 1A and 1B wherein the bottom portion of the lamp 10 includes a lower exiting fiber strand linear density than the upper portion of the lamp 10. In addition, locating holes 44 inside grooves 42 having different angular locations allows for the control of the angular distribution of the light given by the lamp 10.

The strands of the optical fiber 18 are connected to the fiber supporting member 22 using any method known in the art. For example, a silicone glue is provided within the holes 44 prior to the insertion of a strand of the optical fiber 18. When the glue dries, the strands are permanently attached to the fiber supporting member 22.

Then, the fiber supporting member 22 is attached to the mounting member 20. To that effect, the latches 38 simply snap into the notches 32 following the application of a pressing force between the fiber supporting member 22 and the mounting member 20.

To attach the support tube 16 to the fiber optic light bar 12, the support tube 16 is slid into the passageway 30 of the mounting member 20. To prevent the support tube 16 from moving into the mounting member 20, a support tube 16 having a diameter slightly larger than the diameter of the passageway 30 is used. Then, when the support tube 16 is inserted into the passageway 30, the legs 26 flex to allow the support tube 16 to enter the passageway 30. This allows for the support tube 16 to be held frictionally within the passageway 30. The support tube 16 is then attached to the base 14 in any suitable manner.

Many variants to the above described light bar 12 are within the scope of the invention. For example, it is within the scope of the invention to have passageways 30 and 37 presenting cross sections of various shapes such as, for example, a polygonal, an ellipsoidal, an ovoid or a circular cross sections, among others.

In addition, while the fiber supporting member 22 is attached to mounting member 22 through latches 38 and notches 32, the fiber supporting member 22 can be attached to the mounting member 20 in any other suitable manner without departing from the scope of the invention. Also, it is not essential in some embodiments of the invention to have the latches 38 and the notches 32 extending substantially along the entire length of the mounting member 20 and the fiber supporting member 22. Therefore, it is within the scope of the invention to have a plurality of discrete latches 38 and notches 32 on the mounting member 20 and the fiber supporting member 22.

In specific embodiments of the invention, the mounting member 20 and the fiber supporting member 22 each include a polymer.

Also, in specific embodiments of the invention, the support tube 16 and the passageway 30 are of diameters standard in the industry. For example, the support tube 16 is a ½" or ¾" NPT tube.

Figure 3:
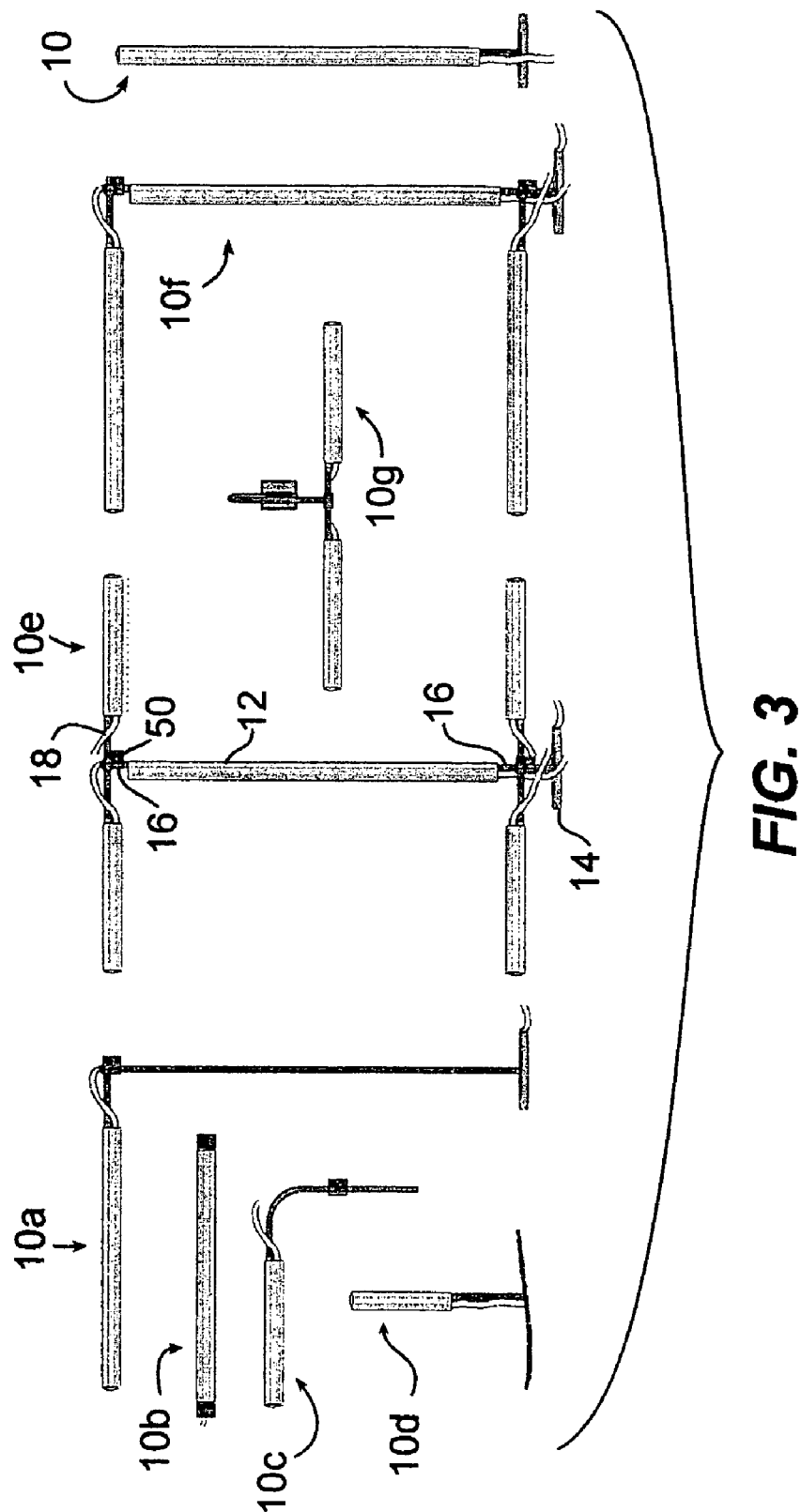
FIG. 3 illustrates a plurality of ways to mount the light bar of FIG. 1.

FIG. 3 illustrates many alternative lamps 10A, 10B, 10C, 10D, 10E, 10F and 10G, along with the lamp 10. Lamps 10A, 10E, and 10F are floor-supported, similarly to lamp 10. Lamps 10B, 10C, 10D and 10G are surface mounted, such as wall mounted or ceiling mounted.

Some embodiments of the invention shown in FIG. 3 include a mounting bracket 50, shown in more detail in FIG. 4. The mounting bracket 50 includes a mounting bracket body 52 defining a support tube passageway 54 that receives the support tube 16 and a slit 56 extending from outside of the mounting bracket 50 to the support tube passageway 54 through the mounting bracket body 52. The slit 56 allows to slightly vary the diameter of the support tube passageway 54. In addition, a screw 58 is inserted through a bore 59 (shown in FIG. 6) extending through the mounting bracket body 52 and through the slit 56. The bore 59 receives a nut 60, thereby allowing the screw 58 and the nut 60 to clamp any support tube 16 having a suitable shape and diameter and located within the support tube passageway 54.

FIG. 5 illustrates a possible use of the mounting bracket 50 wherein two mounting brackets 50 are attached together through a screw (like screw 58 but not visible on FIG. 5) extending through their respective bores. This screw is threaded onto the nut 60. The screw and the nut 60 serve both to link the two mounting brackets 50 and to attach the mounting brackets 50 to respective support tube 16 to be provided within their respective support tube passageways 54.

FIG. 6 shows yet another manner of using the mounting bracket 50. The mounting bracket 50 is attachable to a generally L-shaped bracket 64. To that effect, the L-shaped bracket 64 includes a mounting hole 66 for receiving the screw 58 therethrough. In addition, the L-shaped bracket 64 further includes another mounting hole 68 for receiving another screw 58 for mounting the L-shaped bracket 64 to any suitable surface.

FIGS. 7A to 7E show other alternative manners of mounting the light bar 12. As shown in FIGS. 7A and 7B, the light bar 12 is attachable to suitably dimensioned mounting screw 70 screwed into any suitable surface 74, such as a wall or a ceiling. To that effect, one of the legs 26 is first provided between a head 72 of the mounting screw 70 and the mounting surface 74. Then, by exerting suitable pressure on the light bar 12, the other leg 26 is distanced from the first leg 26, thereby allowing both legs 26 to be located between the mounting screw 70 and the surface 74. Then, the two legs 26 snap back closer to each other, thereby attaching the mounting bar 12 to the mounting screw 70.

By providing a suitable number of mounting screws 70 onto the mounting surface 74, a light bar 12 having any length, is attachable to the mounting surface 74.

In other embodiments of the invention such as shown in FIG. 7C, the light bar 12 has the support tube 16 attachable to any suitable bracket 81. Such brackets are well known in the art and therefore will not be described in further detail.

Also, as shown in FIGS. 7D and 7E, if threaded mounting holes 82 are provided within the support tube 16, the light bar 12 is mountable to any surface through the use of a screw 84 threaded into the threaded mounting holes 82. In addition, any suitable bracket can be used with the mounting screw 84.

Figure 8:
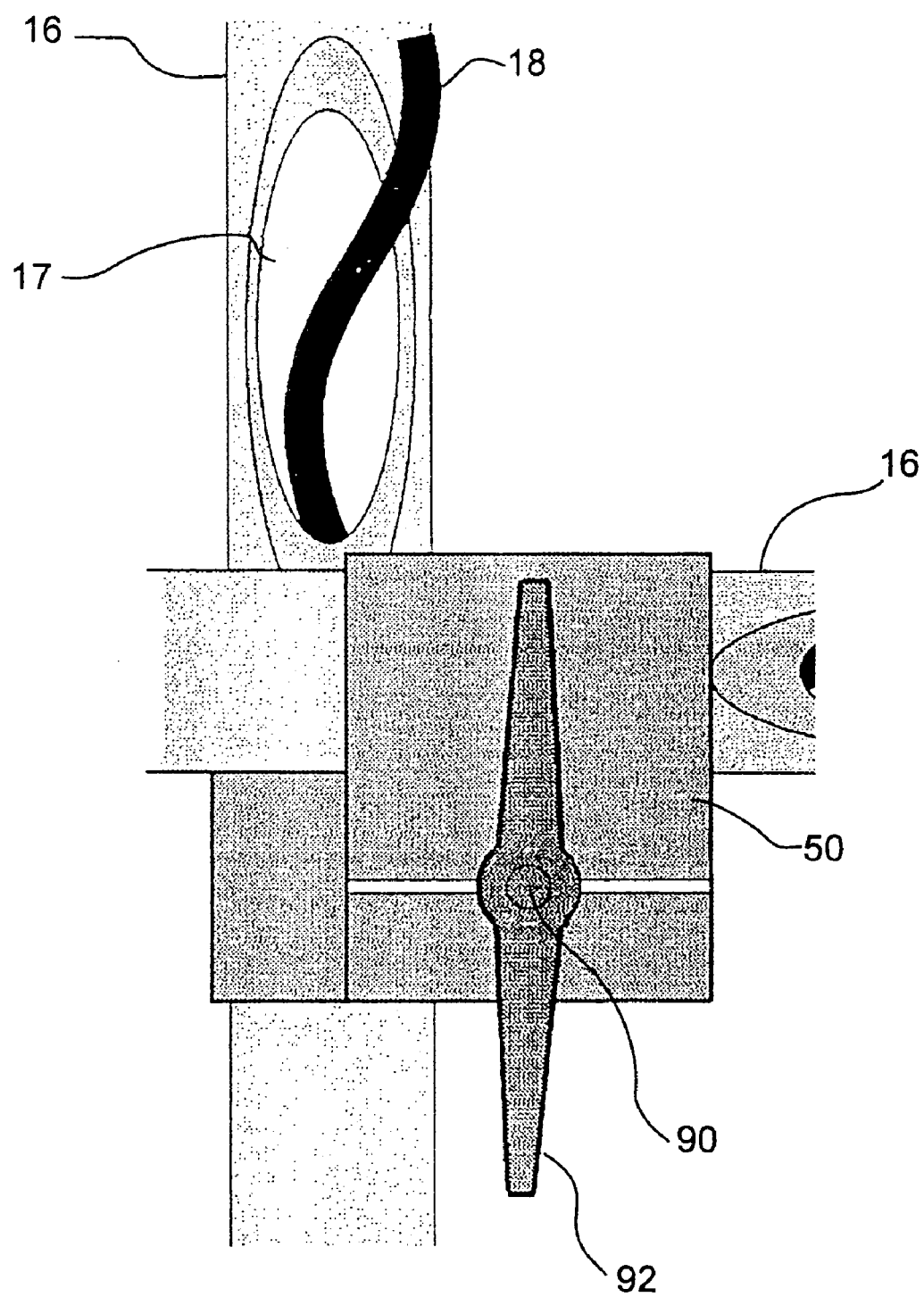
FIG. 8 illustrates a use of the two attached block of FIG. 5.

As shown in FIG. 8, in some embodiments of the invention, the support tubes 16 include openings 17 through which the optical fiber 18 is passed. Then, it is possible to bring an optical fiber 18 to a remotely located light bar 12, as shown for example in FIG. 3, lamp 10E, with the optical fiber 18 hidden from view.

In addition, FIG. 8 shows an example of use of the mounting bracket 50 wherein the screw 58 is replaced by a threaded axle 90 to which a handle 92 is attached. As such ways of closing mounting brackets are well known in the art, this will not be described in further detail herein.

FIG. 3 shows many examples of lamps that can be built using the mounting bracket 50, support tubes 16, and light bars 12. However, the reader skilled in the art will readily appreciate that many other suitable lamps can be built from the above described components, with or without any additional components.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A fiber optic light bar, comprising:
  said light bar including:
  at least one optical fiber;
  a mounting member; and
  a fiber supporting member;
  said fiber supporting member being releasably attached to said mounting member and said optical fiber being supported by said fiber supporting member; and
  a light source for providing light into the optical fiber;
    said fiber optic light bar having at least one hole for receiving said at least one optical fiber; said hole set along the length of said fiber supporting member for receiving said at least one optical fiber;

said mounting member being generally C-shaped, while the fiber supporting member being generally U-shaped;

said mounting member including a body from which a pair of legs extends;

said legs defining an opening extending therebetween;

said body along with said legs, defining a mounting member bore for receiving a support tube;

at least one groove to facilitate the piercing of at least one hole in said body of said fiber supporting member;

said at least one groove extending substantially longitudinally on said body of said fiber supporting member;

said body including two notches provided peripherally to said mounting member;

said notches receiving latches from said supporting member;

said latches extending from said body;

said mounting member further including an arced surface provided peripherally to said body;

said fiber supporting member including a body defining a supporting member bore;

said body, along with said latches defining an opening;

a light cut-off shield extending integrally from said fiber supporting member;

there are a plurality of said hole;

said plurality of said hole being separated by distances of ¼, ½ or 1 inch;

control of the angular distribution of light being determined by different angular locations of grooves.

2. A fiber optic light bar as in claim 1 wherein:

said grooves being separated by an angle of approximately 22.5.

3. A fiber optic light bar as in claim 1 wherein:

said support tube having at least one opening through which said optical fiber is passed.

4. A fiber optic light bar as in claim 1 wherein one method of assembly includes the steps of:

having a mounting screw screwed into any suitable surface and one of said legs first provided between a head of said mounting screw and said mounting surface then, by exerting suitable pressure on said light bar, the other said leg is distanced from the first said leg thereby allowing both said legs to be located between said mounting screw and said surface, and then, the two said legs snapping back closer to each other, thereby attaching said mounting bar to said mounting screw.

* * * * *